(12) United States Patent
Vijayan et al.

(10) Patent No.: US 8,223,853 B2
(45) Date of Patent: Jul. 17, 2012

(54) METHOD AND APPARATUS FOR DECODING DATA IN A LAYERED MODULATION SYSTEM

(75) Inventors: Rajiv Vijayan, San Diego, CA (US); Seong Taek Chung, Redwood City, CA (US); Thomas Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 654 days.

(21) Appl. No.: 11/329,891

(22) Filed: Jan. 10, 2006

(65) Prior Publication Data

US 2006/0171283 A1    Aug. 3, 2006

Related U.S. Application Data

(60) Provisional application No. 60/643,263, filed on Jan. 11, 2005.

(51) Int. Cl.
*H04K 1/10* (2006.01)
(52) U.S. Cl. .......... 375/260; 341/143; 377/34; 375/262; 375/265; 375/341
(58) Field of Classification Search .................. None
See application file for complete search history.

(56) References Cited

U.S. PATENT DOCUMENTS

| | | | |
|---|---|---|---|
| 5,164,959 A * | 11/1992 | Cai et al. ........................ 375/150 |
| 6,571,366 B1 | 5/2003 | Doetsch et al. |
| 6,798,838 B1 | 9/2004 | Ngo |
| 7,248,647 B2 | 7/2007 | Claussen et al. |
| 7,254,171 B2 | 8/2007 | Hudson |
| 7,386,072 B2 * | 6/2008 | Uno ................................ 375/344 |
| 7,630,451 B2 | 12/2009 | Collins et al. |
| 2001/0012322 A1 | 8/2001 | Nagaoka et al. |
| 2002/0064173 A1 | 5/2002 | Watanabe |
| 2005/0157639 A1 * | 7/2005 | Song et al. ..................... 370/208 |
| 2006/0013333 A1 * | 1/2006 | Chen ............................. 375/297 |
| 2006/0178755 A1 | 8/2006 | Ling |
| 2006/0193244 A1 * | 8/2006 | Le Goff ........................ 370/206 |
| 2006/0198454 A1 | 9/2006 | Chung |
| 2006/0227901 A1 | 10/2006 | Gao et al. |
| 2008/0086670 A1 | 4/2008 | Krouk et al. |

FOREIGN PATENT DOCUMENTS

JP    07321765    12/1995

(Continued)

OTHER PUBLICATIONS

Lim, J. H. et al., Labeling and Decoding Schemes for Backward-Compatible Hierarchical Coded Modulation, pp. 123-128, IEEE 2000.

(Continued)

*Primary Examiner* — David C. Payne
*Assistant Examiner* — Adolf Dsouza
(74) *Attorney, Agent, or Firm* — Ryan Farr

(57) ABSTRACT

A decoder for a layered modulation system can be configured to independently and concurrently decode each of a base and enhancement layer. The base layer decoder and enhancement layer decoder can be configured substantially in parallel and can each operate concurrently on the same received layered modulation symbol. Each of the base and enhancement layer decoders can be configured with a bit metric module that is configured to determine a signal quality metric based on the received symbol. In systems having turbo encoded data, the bit metric module can be configured to determine a log likelihood ratio. The ratio is based in part on a channel estimate and an energy ratio used in the layered modulation constellation.

54 Claims, 10 Drawing Sheets

FOREIGN PATENT DOCUMENTS

| | | |
|---|---|---|
| JP | 09307517 | 11/1997 |
| JP | 2000101542 A | 4/2000 |
| JP | 2000115119 A | 4/2000 |
| JP | 2000269827 A | 9/2000 |
| JP | 2002094402 A | 3/2002 |
| JP | 2002507358 | 3/2002 |
| JP | 2003046586 | 2/2003 |
| JP | 2003060615 A | 2/2003 |
| JP | 2003101472 A | 4/2003 |
| JP | 2003304510 A | 10/2003 |
| JP | 2004040661 | 2/2004 |
| JP | 2004128988 | 4/2004 |
| JP | 2008527928 | 7/2008 |
| JP | 2008527931 | 7/2008 |
| WO | WO9600466 | 1/1996 |
| WO | WO 2004/100478 A2 | 11/2004 |

OTHER PUBLICATIONS

Schramm, Peter, Multilevel Coding with Independent Decoding on Levels for Efficient Communication on Static and Interleaved Fading Channels, pp. 1196-1200, IEEE 1997.

Wang, Michael Mao et al., Soft Decision Metric Generation for QAM with Channel Estimation Error, pp. 1058-1061, IEEE 2002.

Papke et al., "Different Iterative Decoding Algorithms for Combined Concatenated Coding and Multiresolution Modulation", Communications, 1994. ICC '94, Supercomm/ICC '94, Conference Record, Serving Humanity Through Communications, IEEE International Confe.

Ramchandran et al., "Multiresolution Broadcast for Digital HDTV Using Joint Source-Channel Coding", Discovering a New World of Communications. Chicago, Jun. 14-18, 1992, Bound Together With B0190700, vol. 3, Proceedings of the Internatonal Conference on C.

Schramm, "Multilevel Coding With Independent Decoding on Levels for Efficient Communication on STTIC and Interleaved Fading Channels", pp. 1196-1200, IEEE 1997.

International Search Report—PCT/US06/000996—ISA-EPO—May 19, 2006.

Written Opinion—PCT/US06/000996—ISA-EPO—May 19, 2006.

International Preliminary Report on Patentability—PCT/US06/000996—The International Bureau of WIPO—Geneva, Switzerland—Jul. 17, 2007.

* cited by examiner

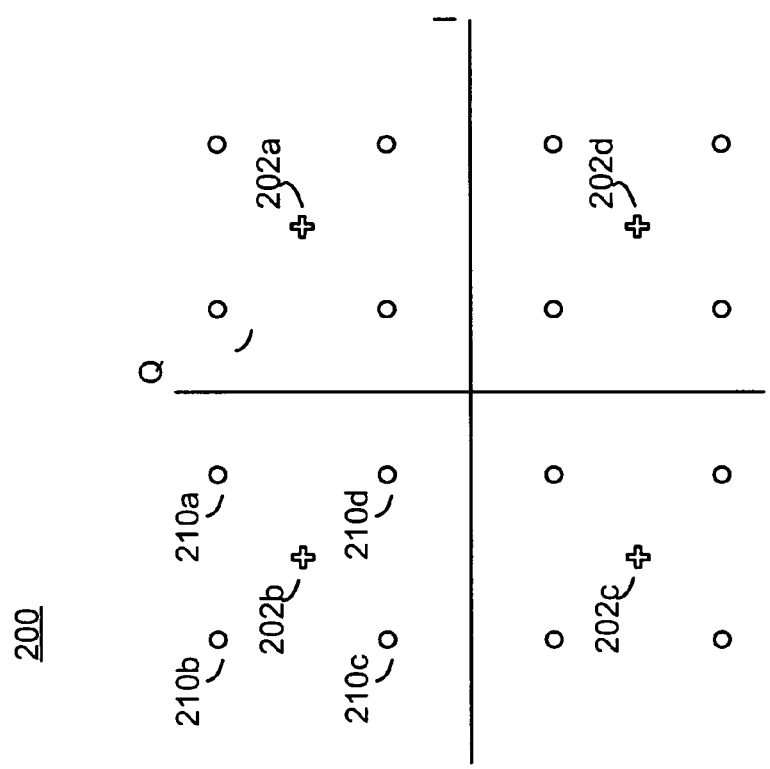

METHOD AND APPARATUS FOR DECODING DATA IN A LAYERED MODULATION SYSTEM

CROSS-REFERENCE TO RELATED APPLICATIONS

The present Application for Patent claims priority to U.S. Provisional Application No. 60/643,263 entitled "LAYERED MODULATION" filed Jan. 11, 2005, and assigned to the assignee hereof and hereby expressly incorporated by reference herein.

The present Application for Patent is related to the following co-pending U.S. Patent Application No. 11/329,717 entitled "ADAPTIVE CHANNEL ESTIMATION THRESHOLDS IN A LAYERED MODULATION SYSTEM" by Seong Taek Chung, filed Jan. 10, 2006, assigned to the assignee hereof, and expressly incorporated by reference herein.

BACKGROUND OF THE INVENTION

Wireless communication systems are continually striving to increase the data bandwidth so that information can quickly be exchanged between devices coupled to the communication system. Some of the parameters that limit the data bandwidth available to devices include the spectral bandwidth allocated to the devices and the quality of the channel linking the devices.

Wireless communication systems compensate for the various constraints on data bandwidth using a variety of techniques. A wireless communication system may incorporate multiple encoding techniques, and may select an encoding technique based on a data rate supported by a channel. In such a system, the communicating devices may negotiate a data rate based on the capabilities of the channel. Such a communication system may be advantageous for multiple point to point links, but may be less than ideal in a distributed broadcast system where a single transmitter provides substantially the same data to multiple receivers.

Wireless communication systems may incorporate hierarchical modulation, also referred to as layered modulation, where multiple data streams are simultaneously transmitted across a hierarchy of data layers. The multiple data streams can include a base layer that is a robust communication link capable of successful reception in nearly all receiver operating conditions. The multiple data streams can also include an enhancement layer that is broadcast at a data rate that is lower, the same, or higher than the data rate of the base layer. The communications over the enhancement layer may require a higher signal quality at the receiver compared to the base layer. Therefore, the enhancement layer may be more sensitive to variations in the quality of the channel.

The receiver is typically ensured the ability to communicate at the base level, and can typically demodulate data on the base layer. In channel conditions sufficient to support the enhancement layer, the receiver is also able to demodulate additional data modulated on the enhancement layer to provide a higher quality of service or to provide additional data bandwidth.

The use of layered modulation signals substantially complicates the receiver operation. However, the receiver may be a portable receiver that has limited power capacity or limited processing capabilities. The complications to the receiver arising from the incorporation of layered modulation operate in contrast to efforts to reduce the size, power consumption, and cost of a receiver.

BRIEF SUMMARY OF THE INVENTION

A decoder for a layered modulation system can be configured to independently and concurrently decode each of a base and enhancement layer. The base layer decoder and enhancement layer decoder can be configured substantially in parallel and can each operate concurrently on the same received layered modulation constellation point. Each of the base and enhancement layer decoders can be configured with a bit metric module that is configured to determine a signal quality metric based on the received constellation point. In systems having turbo encoded data, the bit metric module can be configured to determine a log likelihood ratio. The ratio is based in part on a channel estimate and an energy ratio used in the layered modulation constellation.

Aspects of the invention include a receiver configured to decode a received signal having layered modulation data. The receiver includes an RF processor configured to receive the layered modulation data and configured to frequency convert the layered modulation data to substantially a baseband frequency, a base layer decoder coupled to the RF processor and configured to decode a base layer data from the layered modulation data, and an enhancement layer decoder coupled to the RF processor and configured to decode an enhancement layer data from the layered modulation data, the enhancement layer decoder operating substantially independent of the base layer decoder.

Aspects of the invention include a receiver configured to decode a received signal having layered modulation data. The receiver includes an RF processor configured to receive an OFDM symbol, wherein at least one subcarrier in the OFDM symbol carries layered modulation data, an FFT module coupled to the RF processor and configured to transform the OFDM symbol to a plurality of subcarriers, a base layer decoder coupled to the FFT module and configured to decode a base layer data from the at least one subcarrier carrying the layered modulation data, and an enhancement layer decoder coupled to the FFT module and configured to decode an enhancement layer data from the at least one subcarrier carrying the layered modulation data, the enhancement layer decoder operating substantially independent of the base layer decoder.

Aspects of the invention include a receiver configured to decode a received signal having layered modulation data. The receiver includes an RF processor configured to receive the layered modulation data, a base layer decoder coupled to the RF processor and configured to decode a base layer data from the layered modulation data, the base layer decoder comprising a base bit metric module configured to determine a log likelihood ratio of base layer data from the layered modulation data, and an enhancement layer decoder coupled to the RF processor and configured to decode an enhancement layer data from the layered modulation data, the enhancement layer decoder comprising an enhancement bit metric module configured to determine a log likelihood ratio of enhancement layer data from the layered modulation data.

Aspects of the invention include a method of decoding a layered modulation signal. The method includes receiving the layered modulation signal, decoding a base layer data from the layered modulation signal, and decoding an enhancement layer data from the layered modulation signal substantially concurrently with decoding the base layer data.

Aspects of the invention include a machine readable storage device configured to store one or more processor usable instructions. The instructions include receiving an OFDM symbol including data in a layered modulation channel, generating a channel estimate based in part on the OFDM symbol, decoding a base layer data from the layered modulation channel, and decoding an enhancement layer data from the layered modulation channel concurrently with decoding the base layer data and substantially independent of the base layer decoding.

Aspects of the invention include a transmitter configured to encode a signal having layered modulation data. The transmitter includes a base layer encoder configured to encode base layer data to base layer symbols, an enhancement layer encoder configured to encode enhancement layer data to enhancement layer symbols, a signal mapper coupled to the base layer encoder and enhancement layer encoder and configured to map at least one base layer symbol in combination with at least one enhancement layer symbol to a layered modulation constellation point, and a subcarrier assignment module configured to modulate at least one tone from a logical channel with the layered modulation constellation point based on an energy ratio selected from a plurality of energy ratios.

Aspects of the invention include a method of transmitting a signal having layered modulation data. The method includes encoding a base layer signal to base layer symbols, encoding an enhancement layer signal to enhancement layer symbols, and mapping a base layer symbol in conjunction with an enhancement layer symbol to a constellation point in a layered modulation constellation having an energy ratio selected from a plurality of energy ratios.

Aspects of the invention include a receiver configured to decode a received signal having layered modulation data. The receiver includes means for receiving a layered modulation signal, means for decoding a base layer data from the layered modulation signal, and means for decoding an enhancement layer data from the layered modulation signal substantially concurrently with decoding the base layer data.

Aspects of the invention include a transmitter configured to encode a signal having layered modulation data. The transmitter includes means for encoding a base layer signal to base layer symbols, means for encoding an enhancement layer signal to enhancement layer symbols, and means for mapping a base layer symbol in conjunction with an enhancement layer symbol to a constellation point in a layer

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

FIGS. 2A-2B are constellation diagrams of an embodiment of layered modulation.

DETAILED DESCRIPTION OF THE INVENTION

A receiver and decoders in a receiver can be configured to decode hierarchical or layered modulation data. The receiver operation and processing load is simplified because a base layer decoder can be configured to operate substantially in parallel with an enhancement layer decoder. The base layer and enhancement layer decoders can be configured to operate concurrently on the same received constellation point in a layered modulation constellation. The enhancement layer decoder can operate substantially independent of the base layer decoder and does not rely on the results from the base layer decoder when decoding the enhancement layer.

The receiver can be configured to decode layered modulation data that has been turbo encoded. In such an embodiment, the receiver can include a base layer decoder and enhancement layer decoder configured substantially in parallel. Each of the base layer decoder and enhancement layer decoder can include a bit metric module that can be configured to determine a signal quality metric, such as a log likelihood ratio.

The log likelihood ratio values are based, at least in part, on a received signal and a channel estimate. The bit metric modules can be configured to compare channel estimates against a predetermined threshold value to determine if the actual channel estimate or a predetermined value is to be used in the determination of the LLR values. The receiver operation can be simplified by using the same channel estimate threshold value for both the base layer and enhancement layer LLR determination. Different channel estimate thresholds can be used based on different layered modulation energy ratios.

Figure 1:
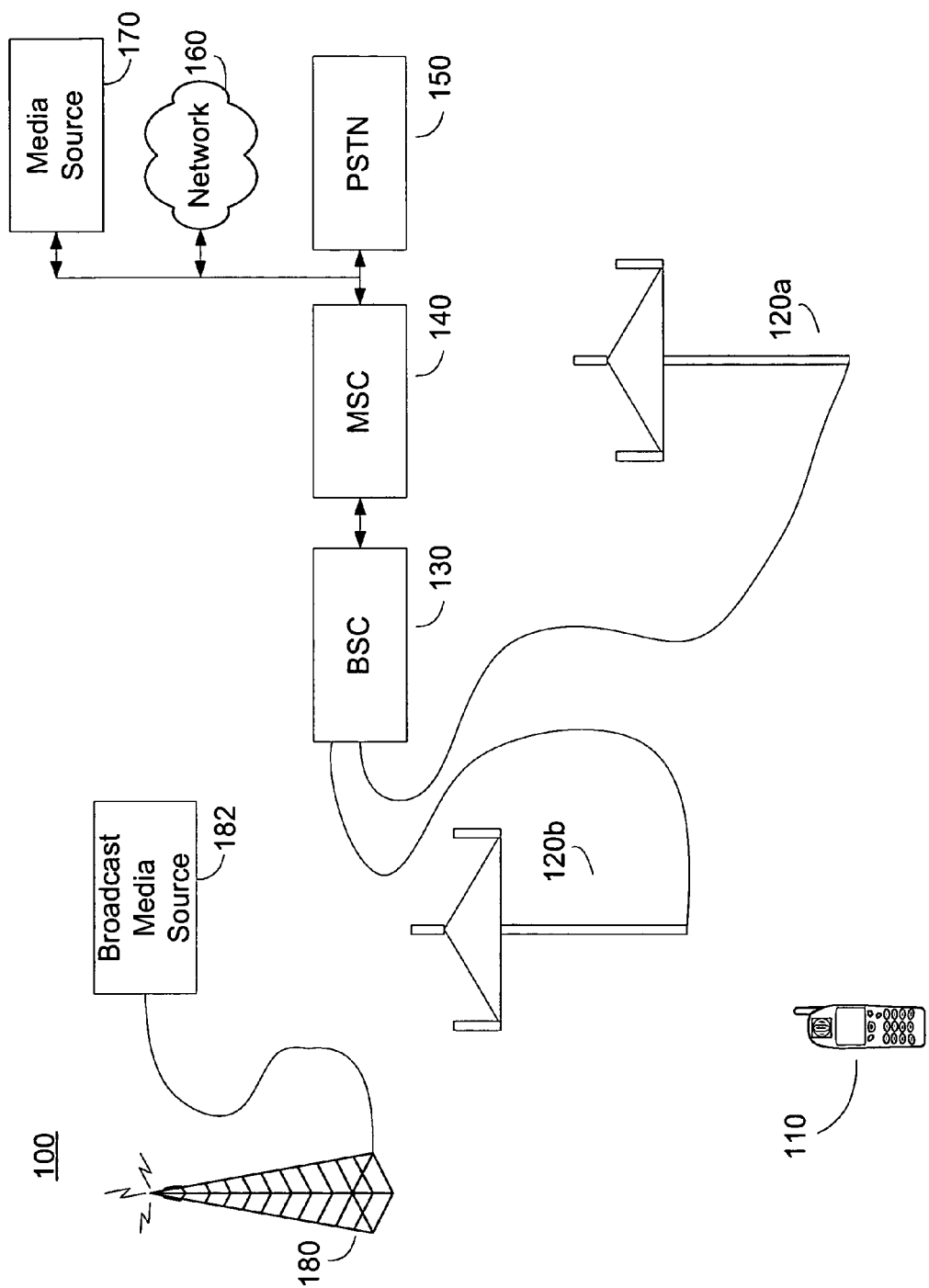
FIG. 1 is a functional block diagram of an embodiment of a wireless communication system incorporating layered modulation.

FIG. 1 is a functional block diagram of an embodiment of a wireless communication system 100 incorporating hierarchical modulation, alternatively referred to as layered modulation. The system includes one or more fixed elements that can be in communication with a user terminal 110. The user terminal 110 can be, for example, a wireless telephone configured to operate according to one or more communication standards using layered modulation. For example, the user terminal 110 can be configured to receive wireless telephone signals from a first communication network and can be configured to receive data and information from a second communication network. In some embodiments, both communication networks can implement layered modulation, while in other embodiments, one of the communication networks may implement layered coded modulation.

The user terminal 110 can be a portable unit, a mobile unit, or, a stationary unit. The user terminal 110 may also be referred to as a mobile unit, a mobile terminal, a mobile station, user equipment, a portable, a phone, and the like. Although only a single user terminal 110 is shown in FIG. 1, it is understood that a typical wireless communication system 100 has the ability to communicate with multiple user terminals 110.

The user terminal 110 typically communicates with one or more base stations 120a or 120b, here depicted as sectored cellular towers. The user terminal 110 will typically communicate with the base station, for example 120b, that provides the strongest signal strength at a receiver within the user terminal 110.

Each of the base stations 120a and 120b can be coupled to a Base Station Controller (BSC) 140 that routes the communication signals to and from the appropriate base stations 120a and 120b. The BSC 140 is coupled to a Mobile Switching Center (MSC) 150 that can be configured to operate as an interface between the user terminal 110 and a Public Switched Telephone Network (PSTN) 150. The MSC can also be configured to operate as an interface between the user terminal 110 and a network 160. The network 160 can be, for example, a Local Area Network (LAN) or a Wide Area Network (WAN). In one embodiment, the network 160 includes the Internet. Therefore, the MSC 150 is coupled to the PSTN 150 and network 160. The MSC 150 can also be coupled to one or more media source 170. The media source 170 can be, for example, a library of media offered by a system provider that can be accessed by the user terminal 110. For example, the system provider may provide video or some other form of media that can be accessed on demand by the user terminal 110. The MSC 150 can also be configured to coordinate inter-system handoffs with other communication systems (not shown).

In one embodiment, the base stations 120a and 120b can be configured to transmit layered modulation signals to the user terminal 110. For example, the base stations 120a and 120b can be configured to transmit a multicast signal that can be directed to the user terminal 110 as well as other receivers (not shown). The layered modulation signals can include a base layer signal that is configured to be robust, and an enhancement layer signal that operates at a lower link margin, and as a result, that is more sensitive to variations in the channel. The enhancement layer can be configured to provide supplemental data to the data supplied on the base layer or provide independent data that has a lower quality of service requirement.

The wireless communication system 100 can also include a broadcast transmitter 180 that is configured to transmit a layered modulation signal to the user terminal 110. In one embodiment, the broadcast transmitter 180 can be associated with the base stations 120a and 120b. In another embodiment, the broadcast transmitter 180 can be distinct from, and independent of, the wireless telephone system containing the base stations 120a and 120b. The broadcast transmitter 180 can be, but is not limited to, an audio transmitter, a video transmitter, a radio transmitter, a television transmitter, and the like or some combination of transmitters. Although only one broadcast transmitter 180 is shown in the wireless communication system 100, the wireless communication system 100 can be configured to support multiple broadcast transmitters 180. A plurality of broadcast transmitters 180 can transmit signals in overlapping coverage areas. A user terminal 110 can concurrently receive signals from a plurality of broadcast transmitters 180. The plurality of broadcast transmitters 180 can be configured to broadcast identical, distinct, or similar broadcast signals. For example, a second broadcast transmitter having a coverage area that overlaps the coverage area of the first broadcast transmitter may also broadcast some of the information broadcast by a first broadcast transmitter.

The broadcast transmitter 180 can be configured to receive data from a broadcast media source 182 and can be configured to hierarchically code the data, modulate a signal based on the hierarchically coded data, and broadcast the modulated hierarchically coded data to a service area where it can be received by the user terminal 110. The broadcast transmitter 180 can generate, for example, base layer data and enhancement layer data from data received from the broadcast media source 182.

The layered modulation data configuration can be advantageous if the enhancement layer does not carry data that is redundant to that carried on the base layer. Additionally, the inability of the receiver to decode the enhancement layer may not result in loss of service. For example, the base layer can be configured to deliver video at a standard video resolution, and the enhancement layer can provide additional data that increases the resolution or SNR of the received video signal. In another embodiment, the base layer can be configured to provide a signal having a predetermined quality, such as a video signal at 15 frames per second, and the enhancement layer can be configured to supplement the information carried on the base layer. For example, the enhancement layer can be configured to carry information used to support a video signal at 30 frames per second. In such a configuration, the inability to decode the enhancement layer data results in lower resolution signal, lower signal quality, or SNR, but not a complete loss of signal.

The user terminal 110 can be configured to demodulate the received signal and decode the base layer. The receiver in the user terminal 110 can implement error control mechanisms as a standard part of the base layer decoder. The receiver in the user terminal 110 can use the error control mechanisms of the base layer decoder to determine a probability of successful enhancement layer decoding. The receiver in the user terminal 110 can then determine whether to decode the enhancement layer based on statistics or metrics generated in the error control mechanisms used in the base layer decoding.

In another embodiment, the user terminal 110 can be configured to substantially decode the base layer and enhancement layers concurrently, without relying on base layer information when decoding the enhancement layer. For example, the user terminal 110 can be configured to determine a single decoder threshold value and use the single decoder threshold value when decoding both the base and enhancement layer. The decoder threshold can be based in part on a characteristic of the layered modulation data. For example, the decoder threshold can be based on a ratio of the power or energy of the enhancement layer relative to the base layer. The decoder threshold can also be based in part on a desired error rate, such as a symbol error rate, bit error rate, packet error rate, or frame error rate. The decoder threshold can be fixed or may vary based, for example, on varying desired quality of service or varying characteristics of the layered modulation data.

FIG. 2A is a constellation diagram 200 of an embodiment of a layered modulation implementation. As an example, the wireless communication system 100 of FIG. 1 may implement layered modulation in the manner shown in FIG. 2A. The layered modulation implementation can be referred to as Quadrature Phase Shift Keying (QPSK) on QPSK. The implementation includes a QPSK modulated base layer. Although a QPSK on QPSK layered modulation implementation is illustrated in FIG. 2A, the decoder apparatus and methods disclosed herein are not limited to any particular type of layered modulation. For example, other layered modulation embodiments may use 16-QAM over QPSK, or some other form of layered modulation.

The QPSK base layer is defined by four points 202a-202d. However, as described later, the points do not need to correspond to actual constellation points in the layered modulation. The enhancement layer is also QPSK modulated. The QPSK modulated enhancement layer occurs on top of the QPSK base layer constellation. The QPSK constellation for the enhancement layer includes four positions, but the constellation can be centered about any of the four constellation points 202a-202d of the base layer.

As an example, a base layer point 202b occurs in the second quadrant, where the in-phase (I) signal component is negative and the quadrature (Q) signal component is positive. On top of the base layer point 202b are four constellation points 210a-210d of the enhancement layer. Similarly, each quadrant, corresponding to a point 202a-202d of the base layer, has four constellation points of the enhancement layer.

The base and enhancement layer data can be mapped to a constellation point based on a predetermined map or algorithm. For example, the base layer data and enhancement layer data can each include two bits per symbol, such that the combination of the base layer and enhancement layer data is four bits. The mapping operation can take the four bits and map them to a constellation point from a predetermined constellation, such as a 16-QAM constellation or a QPSK on QPSK constellation.

Figure 2B:
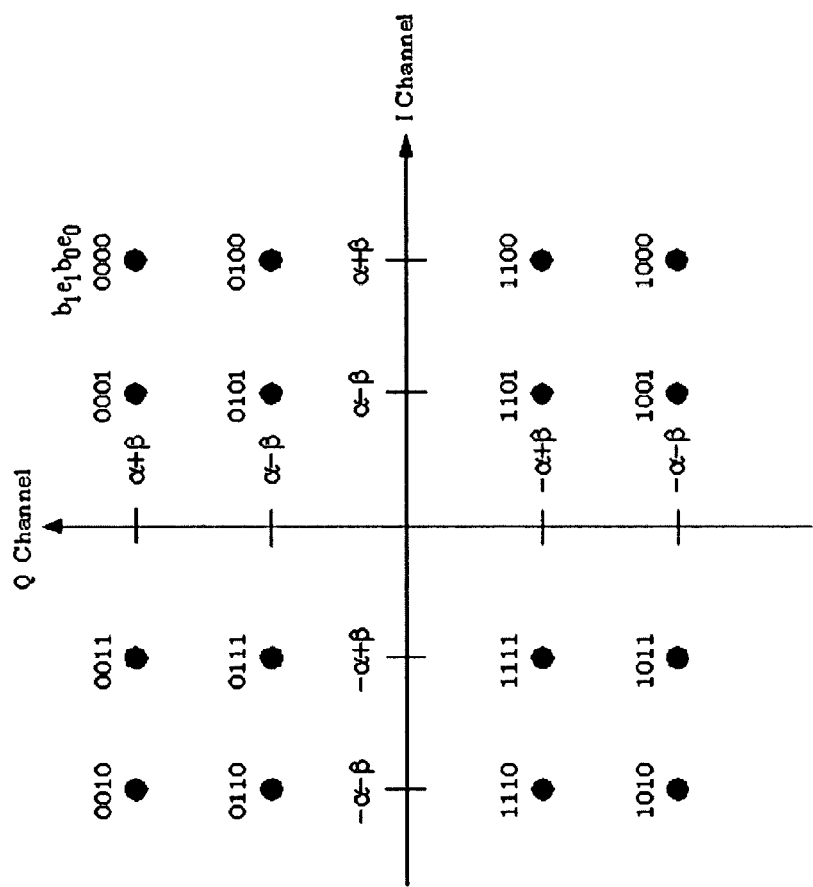

FIG. 2B is a constellation diagram 260 of an embodiment of a particular layered modulation implementation. The constellation diagram 260 of FIG. 2B is substantially a 16-QAM constellation in which the base layer data maps to a particular quadrant of the constellation, and the enhancement layer data maps to the particular position within the constellation. The 16-QAM constellation 260 does not need to be consistently spaced, but may be modified to have a consistent spacing within each quadrant and a distinct spacing between the nearest points within different quadrants. Furthermore, some of the points in the constellation may be mirrored with respect to a midpoint in the quadrant.

The input to a signal mapping block includes 2 bits from the base layer ($b_1\ b_0$) and 2 bits from the enhancement layer ($e_1\ e_0$). The base layer stream is transmitted at a higher power level with respect to the enhancement layer stream and the energy ratio r satisfies the following relationship:

$$r = \frac{\alpha^2}{\beta^2}.$$

By normalizing the average constellation point energy ($=2\alpha^2+2\beta^2$) to 1, $\alpha$ and $\beta$ can be expressed in terms of energy ratio r as $$\alpha = \sqrt{\frac{r}{2(1+r)}}$$

$$\beta = \sqrt{\frac{2}{2(1+r)}}$$

The same energy ratio can be used for multiple tones in the same logical channel of an OFDM system, where a logical channel can include one or more tones from the OFDM group of tones. However, the energy ratio can change from logical channel to logical channel. Therefore, the signal mapping block can map the same data to different constellations depending on the energy ratio, with the constellation determined by the energy ratio. Thus, an OFDM symbol can include multiple logical channels. The tones of a particular logical channel can have a different energy ratio relative to tones corresponding to another logical channel in the same OFDM symbol.

For example, a signal mapping block can be configured to map base and enhancement layer data to one of two constellations, where the two constellations correspond to energy ratios of 4 and 9. Note, the layered modulation signal constellation follows the Gray mapping, and the signal constellation for layered modulation is equivalent to the signal constellation of 16-QAM when the energy ratio, r, is equal to 4

In other embodiments, the signal constellation for layered modulation is a simple addition of two scaled QPSK signal constellation. Such a simple additions of QPSK constellations does not follow a Gray mapping rule as does the constellation shown in FIG. 2B. A signal constellation that does not follow Gray mapping may provide reduced performance compared to a constellation conforming to Gray mapping.

The underlying data defining the respective quadrants of the base and enhancement layers can be encoded using one or more encoding processes. The encoding process used can be any encoding process, and the type of encoding is not a limitation on the decoding apparatus and methods disclosed herein, except where the decoder is specific to a particular encoder. The encoder can include, for example, a convolutional encoder, a turbo encoder, a block encoder, an interleaver, a CRC encoder, a combination of encoders, and the like, or some other process or apparatus for encoding data.

Figure 3:
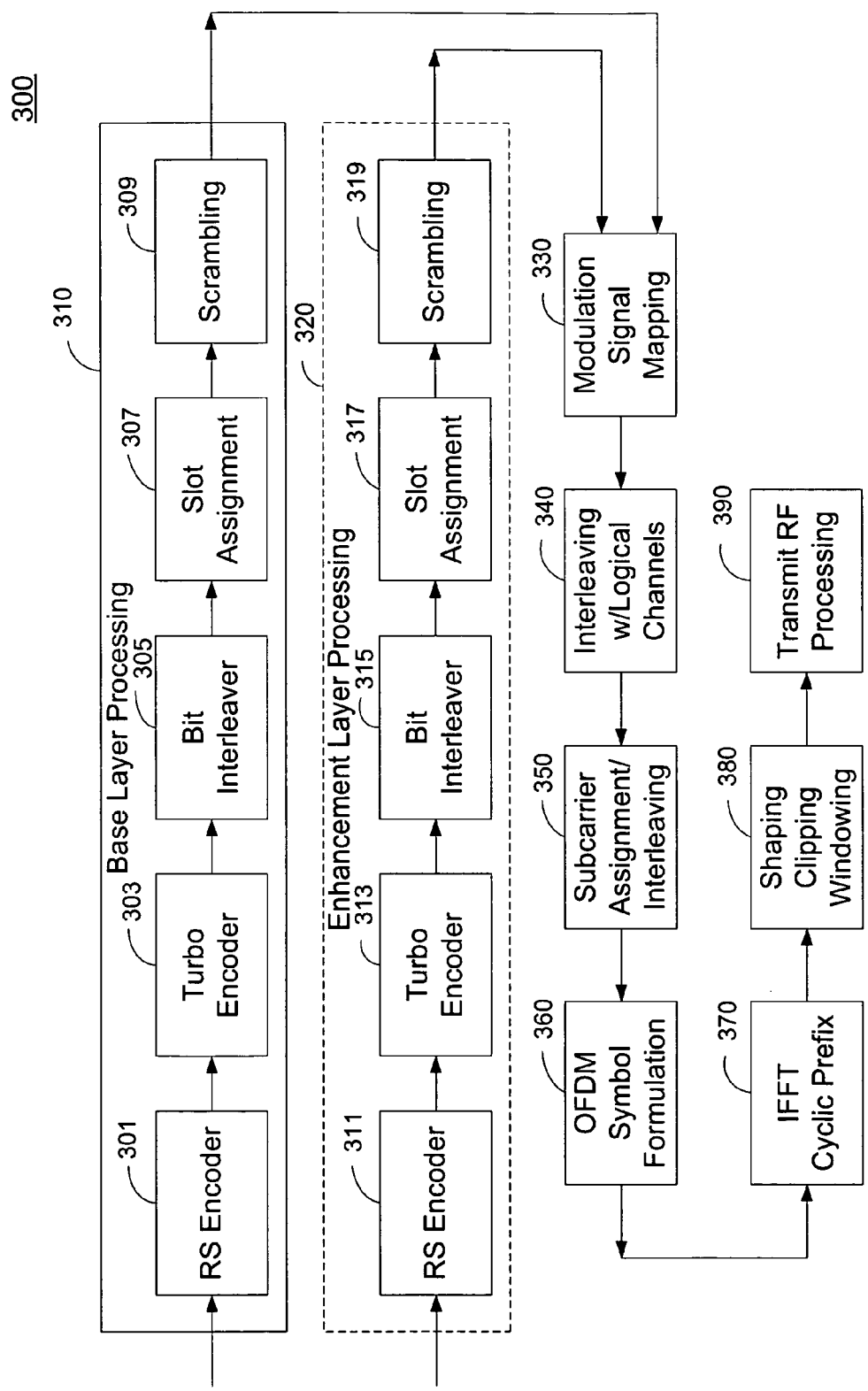
FIG. 3 is a functional block diagram of an embodiment of a transmitter in a layered coded modulation system.

FIG. 3 is a functional block diagram of an embodiment of a transmitter 300 configured for a layered modulation system. In one embodiment, the transmitter 300 can be implemented in the broadcast transmitter of the system of FIG. 1. The transmitter 300 of FIG. 3 can be configured for layered modulation in an Orthogonal Frequency Division Multiple Access (OFDMA) or Orthogonal Frequency Division Multiplex (OFDM) system using the constellation of FIG. 2B. However, the transmitter 300 shown in FIG. 3 represents an embodiment and is not a limitation on the disclosed decoder apparatus and methods. For example, a single carrier system can be modulated with layered modulation data, and the corresponding decoder in a receiver can be configured to operate on a single carrier with layered modulation.

The transmitter 300 can include substantially similar base layer and enhancement layer processing blocks, 310 and 320, respectively. The base layer processing block 310 can be configured to process base layer data into a desired modulation format, for example QPSK. The enhancement layer processing block 320 can be similarly configured to process enhancement layer data into a desired modulation format, for example QPSK.

The base layer processing block 310 and the enhancement layer processing block 320 receive the respective data from a source encoder (not shown), which can be the broadcast media source of FIG. 1. In one embodiment, the base layer data and the enhancement layer data can include video signals, audio signals, or some combination of video and audio signals. The video/audio signal in the base layer corresponds to the data required to reproduce basic quality of service at the receiver. The video/audio signal in the enhancement layer corresponds to the additional data required to generate more enhanced quality of service at the receiver. Hence, users capable of decoding two layers (base layer and enhancement layer) can enjoy fully enhanced quality of video/audio signal while users capable of decoding the base layer can get a minimum quality of video/audio signal.

Within each of the base layer processing block 310 and the enhancement layer processing block 320, the data is coupled to a Reed Solomon encoder 301 or 311 for block coding. The output of the Reed Solomon encoders 301 and 311 are coupled to respective turbo encoders 303 and 313. The turbo encoders 303 and 313 can be configured to turbo encode the data according to a predetermined encoding rate. The encoding rate can be fixed or selectable from a plurality of encoder rates. For example, the turbo encoders 303 and 313 can independently be configured to provide a coding rate of ⅓, ½, or ⅔.

The turbo encoder 303 and 313 outputs are coupled to respective bit interleavers 305 and 315 to improve resistance to burst errors. The output of the bit interleavers 305 and 315 are coupled to respective slot assignment modules 307 and 317. The slot assignment modules 307 and 317 can be configured to time align the encoded symbols with a predetermined time slot, such as an interleaving time slot in a time division multiplexed system. The outputs of the slot alignment modules 307 and 317 are coupled to respective scramblers 309 and 319. The output of the scramblers 309 and 319 represent the encoded base layer and enhancement layer symbols.

The symbols from the two layers are combined at a signal mapping block 330. The signal mapping block 330 can be configured to map the base and enhancement layer symbols to a particular point in the constellation for the layered modulation. For example, the signal mapping block 330 can be configured to map one or more base layer symbols along with one or more enhancement layer symbols to a single point in the layered modulation constellation. The signal mapping block 330 can be configured to map each logical channel to a constellation having a predetermined energy ratio. However, different logical channels can be mapped to constellations having different energy ratios.

The output of the signal mapping block 330 is coupled to a time interleaver 340 that is configured to interleave the mapped constellation point to a particular logical channel. As described earlier, the system may implement a time division multiplex configuration where a single logical channel is time multiplexed with a plurality of other logical channels. The aggregate of logical channels can be time interleaved, or otherwise time multiplexed, using a predetermined time multiplex algorithm, such as a round robin assignment.

The output of the time interleaver 340 is coupled to a subcarrier assignment module 350. The subcarrier assignment module can be configured to assign one or more tones, frequencies, or subcarriers from an OFDM tone set to each set of time interleaved logical channels. The subset of subcarriers assigned to a set of time interleaved logical channels can range from one channel to a plurality of subcarriers up to all available subcarriers. The subcarrier assignment module 350 can map a serial time interleaved set of logical channels to a subset of subcarriers according to a predetermined algorithm. The predetermined algorithm can be configured to assign the logical channels in a persistent manner, or can be configured to assign subcarriers according to a frequency hopping algorithm.

The output of the subcarrier assignment module 350 is coupled to an OFDM symbol module 360 that is configured to modulate the subcarriers based on the assigned layered modulation symbol. The modulated OFDM subcarriers from the OFDM symbol module 360 are coupled to an IFFT module 370 that can be configured to generate an OFDM symbol and append or prepend a cyclic prefix or a predetermined length.

The OFDM symbols from the IFFT module 370 are coupled to a shaping block 380 where the OFDM symbols can be shaped, clipped, windowed, or otherwise processed. The output of the shaping block 380 is coupled to a transmit RF processor 390 for conversion to a desired operating frequency band for transmission. For example, the output of the transmit RF processor 390 can include or be coupled to an antenna (not shown) for wireless transmission.

Figure 4:
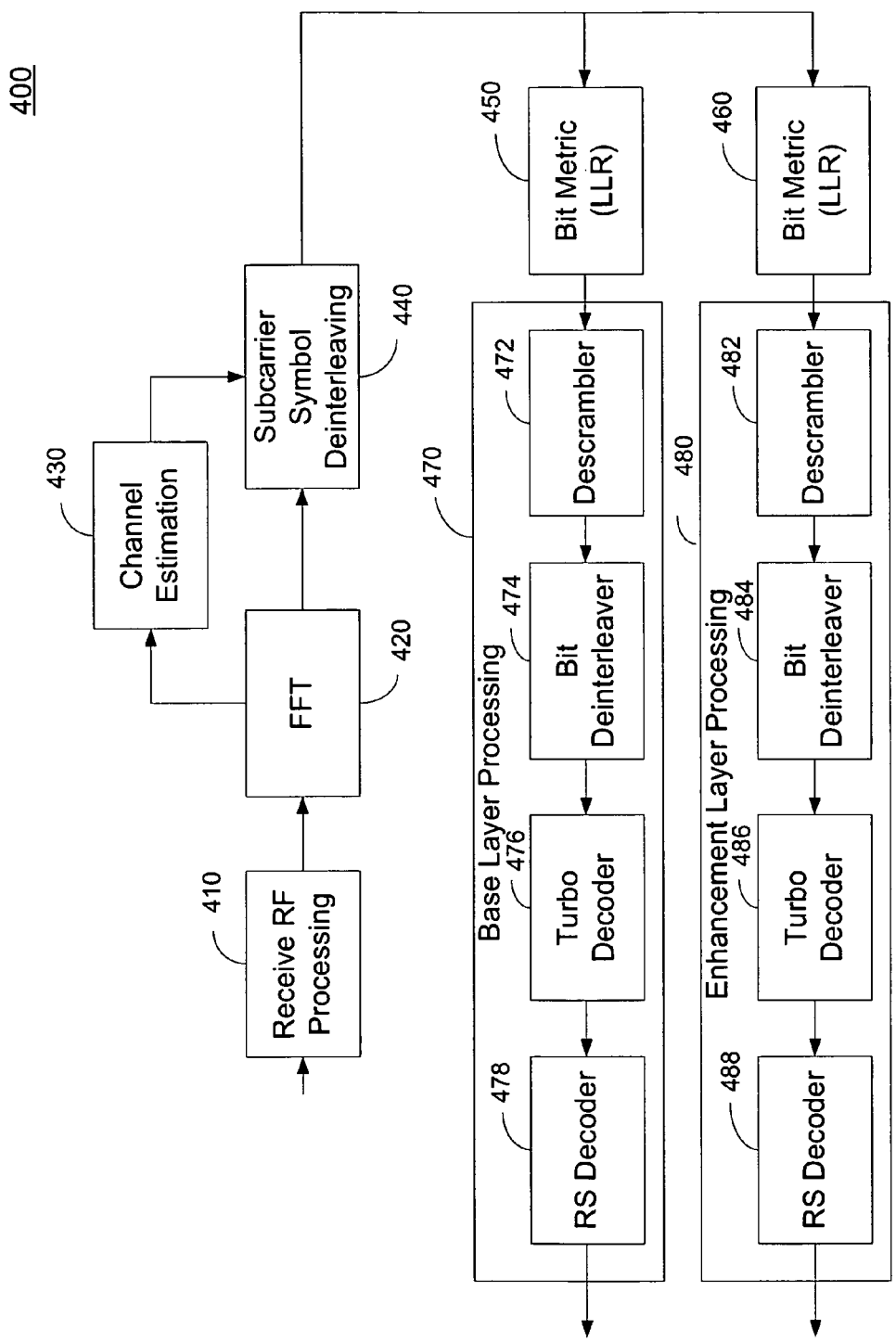
FIG. 4 is a functional block diagram of an embodiment of a receiver configured for operation in a layered modulation system.

FIG. 4 is a functional block diagram of a receiver 400 configured to decode the layered modulation data generated by the transmitter of FIG. 3. In one embodiment, the receiver 400 can be implemented in the user terminal of the system of FIG. 1.

The receiver 400 includes a receive RF processor configured to receive the transmitted RF OFDM symbols, process them and frequency convert them to baseband OFDM symbols or substantially baseband signals. A signal can be referred to as substantially a baseband signal if the frequency offset from a baseband signal is a fraction of the signal bandwidth, or if signal is at a sufficiently low intermediate frequency to allow direct processing of the signal without further frequency conversion. The OFDM symbols from the receive RF processor 410 are coupled to an FFT module 420 that is configured to transform the OFDM symbols to the layered modulation frequency domain subcarriers.

The FFT module 420 can be configured to couple one or more subcarriers, such as predetermined pilot subcarriers, to a channel estimator 430. The pilot subcarriers can be, for example, one or more equally spaced sets of OFDM subcarriers. The channel estimator 430 is configured to use the pilot subcarriers to estimate the various channels that have an effect on the received OFDM symbols. In one embodiment, the channel estimator 430 can be configured to determine a channel estimate corresponding to each of the subcarriers. The channel estimates at a particular subcarrier can be used as a channel estimate for adjacent subcarriers, for example, those subcarriers within a predetermined coherence bandwidth of the pilot subcarrier.

The subcarriers from the FFT module 420 and the channel estimates are coupled to a subcarrier symbol deinterleaver 440. The symbol deinterleaver 440 can be configured to reverse the symbol mapping performed by the subcarrier assignment module of FIG. 3.

The receiver 400 is configured to perform base layer decoding and enhancement layer decoding on each OFDM subcarrier or tone. FIG. 4 illustrates a single base layer decoder and enhancement layer decoder for the sake of clarity and brevity.

The base layer decoder and enhancement layer decoder can operate substantially in parallel. Each of the decoder modules can be configured to operate concurrently on the same received constellation points. The enhancement layer decoder can thus operate substantially independently of the base layer decoder and does not rely on the results of the base layer decoder when decoding the enhancement layer data. The base layer decoder and enhancement layer decoders can be considered to operate substantially independently even though the decoders share some sub-modules, provided the enhancement layer decoder does not rely on the decoding results obtained from the base layer decoder. Thus, the base layer decoder and enhancement layer decoder can share channel estimates, and can even share a single bit metric module, for example 450. Yet, the decoders can be considered substantially independent if the enhancement layer decoder does not rely on the results of the base layer decoder when decoding the enhancement layer data.

The decoders illustrated in the receiver 400 embodiment of FIG. 4 are configured to decode turbo encoded layered modulation data. Of course, if the transmitter is configured to generate some other type of encoding, the decoders in the receiver 400 would be matched to the encoder type. For example, the transmitter can be configured to encode the data using turbo coding, convolutional coding, Low Density Parity Check (LDPC) coding, or some other encoding type. In such an embodiment, the receiver 400 is configured with the complementary decoders. Thus, each of the base layer decoders and enhancement layer decoders in the receiver 400 can be configured to provide turbo decoding, convolutional decoding, such as using Viterbi decoding, LDPC decoding, or some other decoder or combination of decoders.

Each of the layered modulation tones is coupled to a base layer bit metric module 450 and an enhancement layer bit metric module 460. The bit metric modules 450 and 460 can operate on the layered modulation tone to determine a metric indicative of the quality of the received constellation point.

In one embodiment, where the symbols represented in the constellation point are turbo coded, the bit metric modules 450 and 460 can be configured to determine a log likelihood ratio (LLR) of the received symbols represented by the constellation point. The LLR is the logarithm of the likelihood ratio. The ratio can be defined as the probability that the original bit is 1 over the probability that the original bit is equal to 0. Alternatively, the ratio can be defined in a reverse way, where the LLR is the probability that the original bit is 0 over the probability that the original bit is equal to 1. There is no substantial difference between these two definitions. The bit metric modules 450 and 460 can use, for example, the constellation point magnitudes and the channel estimate to determine the LLR values.

Each bit metric module 450 and 460 utilizes a channel estimate and a received signal to determine a LLR value. A noise estimate may also be used. However, the noise estimate term can be substantially ignored if a turbo decoding method that provides the same results regardless of the noise estimate is used. In such an embodiment, the bit metric modules 450 and 460 hardware can use a predetermined value as the noise estimate in calculating LLR values.

The output of the base bit metric module 450 is coupled to a base layer processor 470. The output of the enhancement layer bit metric module 460 is coupled to an enhancement layer processor 480 that functionally, operates similarly to the base layer processor 470. For example, the LLR values are coupled from the bit metric modules 450 and 460 to the respective base layer or enhancement layer processors 470 and 480.

The base layer processor 470 includes a descrambler 472 configured to operate on the received LLR values to reverse the symbol scrambling performed in the encoder. The output of the symbol descrambler 472 is coupled to a bit interleaver 474 that is configured to deinterleave the previously interleaved symbols. The output of the bit deinterleaver 474 is coupled to a turbo decoder 476 that is configured to decode turbo encoded symbols according to the coding rate used by the turbo encoder. For example, the turbo decoder 476 can be configured to perform decoding of rate ⅓, ½, or ⅔ turbo encoded data. The turbo encoder 476 operates, for example, on the LLR values. The decoded outputs from the turbo decoder 476 is coupled to a Reed Solomon decoder 478 that can be configured to recover the base layer bits based in part on the Reed Solomon encoded bits. The resulting base layer bits are transferred to a source decoder (not shown).

The enhancement layer processor 480 operates similar to the base layer processor 470. A descrambler 482 receives the LLR values from the enhancement bit metric module 460. The output is coupled to a bit deinterleaver 484 and the turbo decoder 486. The output of the turbo decoder 486 is coupled to the Reed Solomon decoder 488. The resulting enhancement layer bits are transferred to a source decoder (not shown).

The exact expression for the LLR is given by:

$$LLR_i = \log \frac{\sum_{x:x_i=0} \exp(-|y - hx|^2/N_0)}{\sum_{x:x_i=1} \exp(-|y - hx|^2/N_0)}.$$

In the equation, $LLR_i$ is the LLR of the i'th bit encoded by the modulation symbol and $x_i$ denotes the i'th bit of the constellation point x. The value y represents the received symbol, h represents the channel estimate, and $N_0$ represents the noise estimate. Computing the exact solution is generally too complicated or processing intensive to be implemented in practice.

An approximation can be determined as the maximum of the variables. For QPSK this approximation in fact corresponds to the exact LLR expression. If we use this approximation, the following result holds;

$$LLR_i = \frac{2\text{Re}\{h(b-a)y^*\}}{N_0} + \frac{hh^*}{N_0}(aa^* - bb^*).$$

Here, b is the closest 0 bit point in the constellation and a is the closest 1 bit point in the constellation. The equation can be simplified furthermore once a specific modulation scheme is determined.

Figure 5:
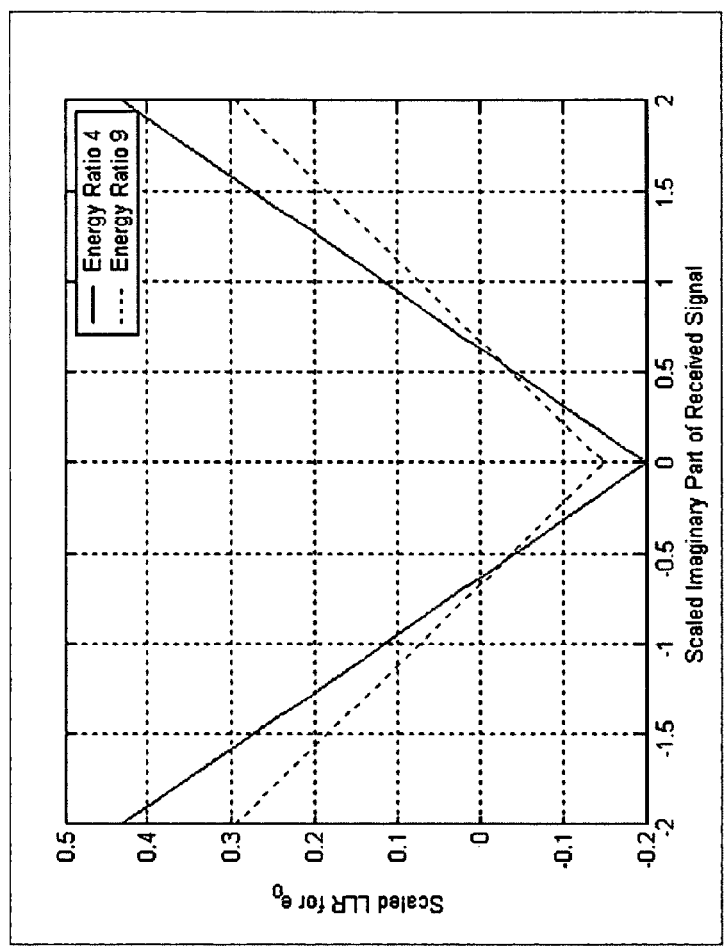
FIG. 5 is a plot of LLR versus relevant part of the received signal for an embodiment of enhancement layer data.
Figure 6:
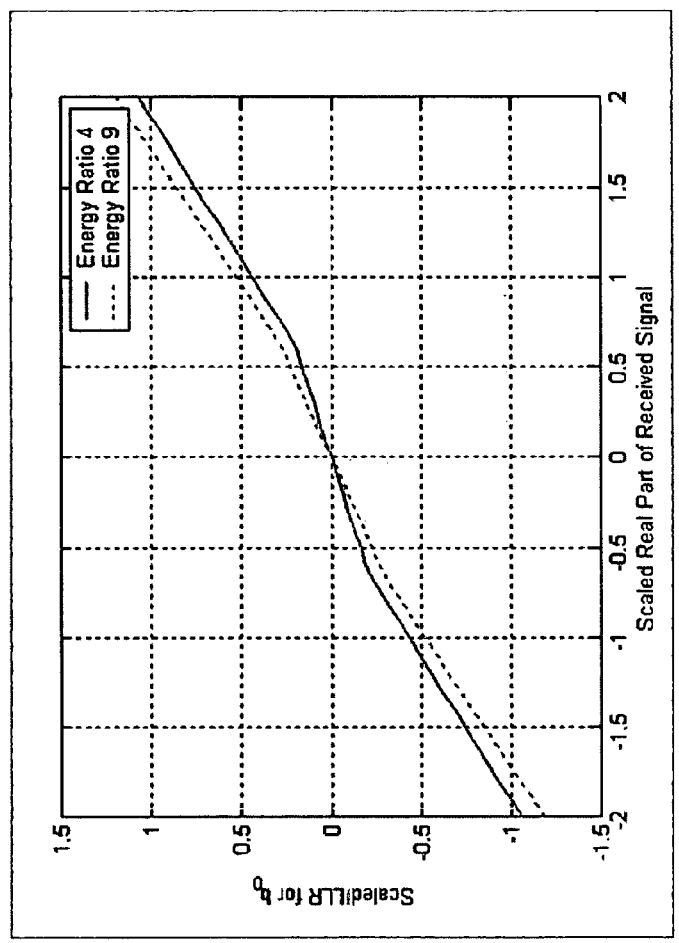
FIG. 6 is a plot of LLR versus relevant part of the received signal for an embodiment of base layer data.

FIGS. 5 and 6 provide plots of the LLR for the base layer and enhancement layer data when modulated using the constellation shown in FIG. 2B. FIG. 5 shows the LLR for the $e_0$ bit of the enhancement layer. However, the plot for the LLR for the $e_1$ bit of the enhancement layer is substantially the same, with the horizontal axis changed to refer to the Real part of the received signal. Similarly, FIG. 6 shows the LLR for the $b_0$ bit of the base layer. However, the plot for the LLR for the $b_1$ bit of the base layer is substantially the same, with the horizontal axis changed to refer to the Imaginary part of the received signal.

In the LLR calculation block the LLR value depends on a channel estimate from the channel estimation block. The performance of each layer depends on a threshold value being used in the channel estimation block. The channel estimation threshold value represents a value over which the channel estimate is used. That is, if the channel estimate exceeds the threshold value, the actual channel estimate is used. Conversely, if the channel estimate is less than the threshold value, the channel estimate is assigned a predetermined value, which can be, for example, zero or some other sufficiently small value. If the channel estimate is equal to the threshold value, the receiver can be configured to use the actual channel estimate or use the predetermined value. Either option is practical, provided the decision is executed consistently.

The channel estimation module in the receiver estimates the channel for each tone in a multiple channel system, such as an OFDM system. Thus, the channel estimation module or each bit metric module can compare the channel estimate to the threshold. It may be advantageous to perform the comparison of the channel estimate to the threshold at the channel estimation module.

In one embodiment, the channel estimation module can be configured to separate the pilot tones used in channel estimation from the output of the FFT module. The channel estimation module can then transform the pilot samples to a time domain channel estimate using, for example, an Inverse FFT (IFFT). Each of the time domain taps represents a component of a channel estimate. The channel estimation module can then filter the individual time domain samples or taps based on the channel estimation threshold value. The channel estimation module can compare a magnitude of each actual time domain tap to the channel estimation threshold. The channel estimation module can select one of the actual time domain tap or a predetermined value based on the comparison. Once the channel estimation module processes the time domain taps based on the channel estimation threshold value, the channel estimation module can transform the processed time domain samples or taps back to frequency domain channel estimates. For example, the channel estimation module can Fourier transform the processed time domain taps to generate the frequency domain channel estimates.

The channel estimation threshold value was optimized using simulations for the following two channel models; Repeated International Telecommunications Union (ITU) Pedestrian B (PEDB) model with 120 km/hr and Repeated Advanced Television Systems Committee (ATSC) model with 20 km/hr.

Table 1 shows an example of optimal threshold for the base layer and

Table 2 shows the optimal threshold value for the enhancement layer. When the turbo code rate is ⅔, the enhancement layer cannot achieve Packet Error Rate (PER) of 0.01 due to a RF noise floor and Inter-Chip-Interference (ICI) from Doppler speed. The scalar threshold value shown in the tables refers to a scalar multiplier that is applied to a normalized channel estimate value to achieve the channel estimation threshold. For example, the normalized channel estimate value can be an average of the time domain taps derived from the pilot tones.

TABLE 1

Optimal threshold value for the Base Layer

|  | Turbo Rate = ⅓ | Turbo Rate = ½ | Turbo Rate = ⅔ |
|---|---|---|---|
| Ratio 4, PEDB Rep. (120 km/hr) | 2 or 3 | 1 or 1.5 | 0.5 |
| Ratio 4, ATSC Rep. (20 km/hr) | 2 or 3 | 1 or 1.5 | 0.5 or 1 |
| Ratio 9, PEDB Rep. (120 km/hr) | 2 or 3 | 1 or 1.5 | 1 |
| Ratio 9, ATSC Rep. (20 km/hr) | 2 or 3 | 1.5 | 1 |

TABLE 2

Optimal threshold value for the Enhancement Layer

|  | Turbo Rate = ⅓ | Turbo Rate = ½ | Turbo Rate = ⅔ |
|---|---|---|---|
| Ratio 4, PEDB Rep. (120km/hr) | 1 | 0.5 | 0.25 |
| Ratio 4, ATSC Rep. (20 km/hr) | 1 | 0.5 | 0.25 |
| Ratio 9, PEDB Rep. (120 km/hr) | 0.5 (The value 1 will give 0.3 dB loss.) | 0.25 | NA |
| Ratio 9, ATSC Rep. (20 km/hr) | 1 | 0.25 | NA |

These two tables show that the optimal threshold value is almost constant over channel models, but depend on the layer, the code rate, and the energy ratio between two layers. From an implementation viewpoint, the receiver structure can be simplified by using the same threshold value for both layers.

The use of the same threshold value may result in some signal degradation over using separate optimized threshold values. One embodiment targets less than a 0.5 dB loss (degradation) in order to eliminate need to have two separate threshold values. Table 3 shows this result of a single threshold value.

TABLE 3

Threshold value for both layers, allowing 0.5 dB loss

|  | Turbo Rate = ⅓ | Turbo Rate = ½ | Turbo Rate = ⅔ |
|---|---|---|---|
| Ratio 4, PEDB Rep. (120 km/hr) | 2 | 1 | 0.25 |
| Ratio 4, ATSC Rep. (20 km/hr) | 2 | 1 | 0.25 |
| Ratio 9, PEDB Rep. (120 km/hr) | Impossible (1 if 1 dB loss is allowed.) | Impossible (0.5 if 1 dB loss is allowed.) | 1 (the enhancement layer NA) |
| Ratio 9, ATSC Rep. (20 km/hr) | 1 | 0.5 | 1 (the enhancement layer NA) |

This table shows that for energy ratio 4, it is possible to have the same threshold values for both layers if we allow them to endure 0.5 dB performance loss. However, for energy ratio 9, it is impossible. For ATSC channel, which is less frequency selective than PEDB channel, it is possible to have the same threshold value within 0.5 dB loss. However, for PEDB channel, it is impossible to have the same threshold. If we allow 1 dB performance loss, then it is possible to use the same threshold for energy ratio 9 as well.

Figure 7:
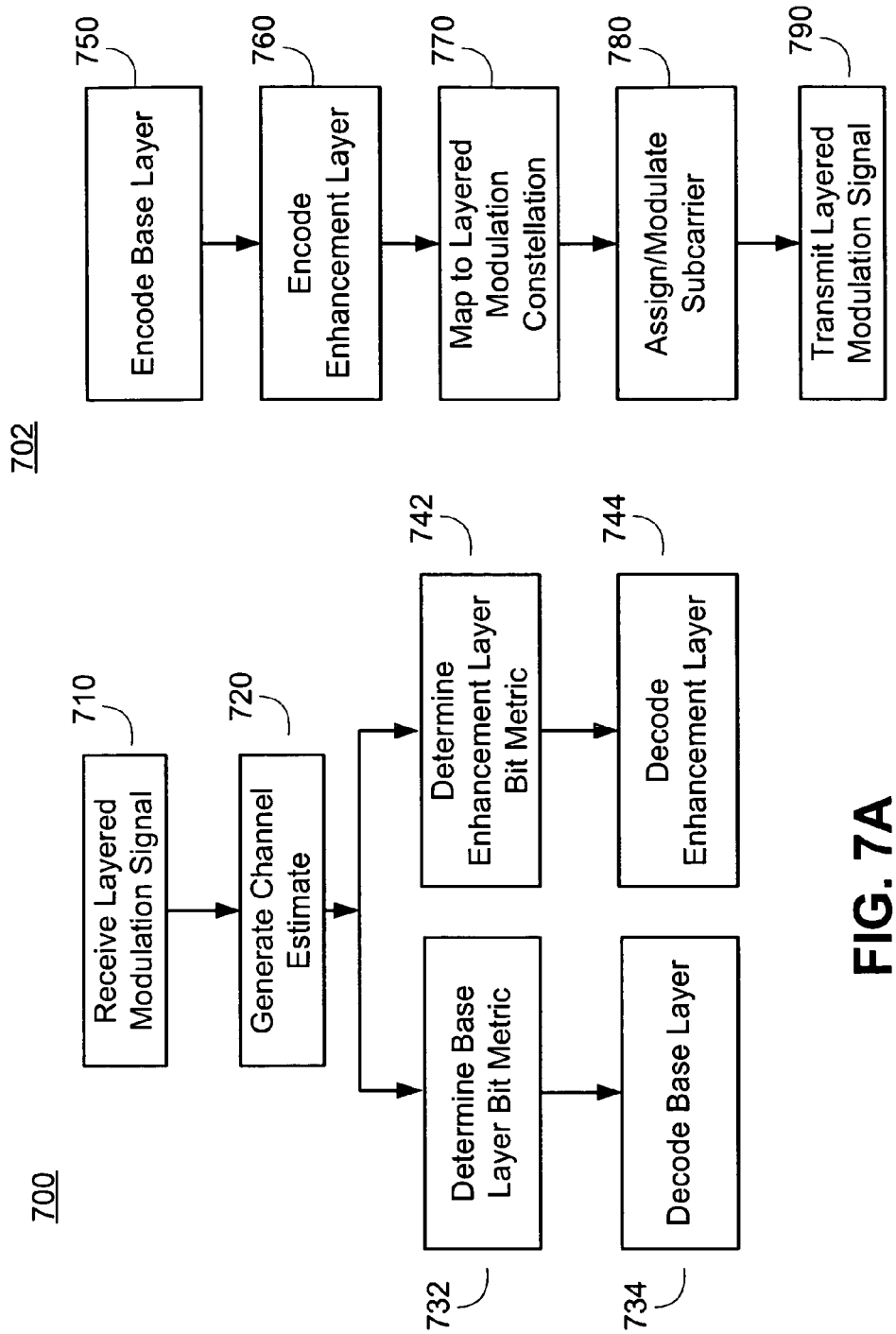
FIGS. 7A-7B are simplified flowcharts of embodiments of receiving and transmitting layered modulation signals.

FIG. 7A is a simplified flowchart of an embodiment of a method 700 of receiving a layered modulation signal. The method 700 can be performed, for example, by the receiver of FIG. 4.

The method 700 begins at block 710 where the receiver receives a layered modulation signal. The receiver proceeds to block 720 and generates a channel estimate based on the received layered modulation signal.

The channel estimate can be generated using one or more pilot tones, and can include filtering channel estimates. The receiver can filter the channel estimates by comparing each of the channel estimate components to a threshold value. The receiver can select, for each of the channel estimate components, an actual channel estimate component or a predetermined value based on the comparison. In one embodiment, the predetermined value is zero, or a signal value that is a substantially insignificant value. A substantially insignificant value is one that contributes virtually no signal of significance to the channel estimate.

After generating the channel estimate, the receiver proceeds to two substantially independent paths. In a first path, the receiver proceeds to block 732 and determines a base layer bit metric. The bit metric can be, for example, a Log Likelihood Ratio (LLR) as described above. The receiver proceeds from block 732 to block 734 and decodes the base layer. The receiver can decode the base layer based in part on the base layer LLR and the channel estimate.

The second path begins at block 742, where the receiver determines an enhancement layer bit metric. The receiver can determine, for example, a LLR for the enhancement layer signal. The receiver proceeds to block 744 and decodes the enhancement layer based in part on the enhancement layer LLR and the channel estimate.

FIG. 7B is a simplified flowchart of a method 702 of transmitting a layered modulation signal. The method 702 can be performed, for example, by the transmitter of FIG. 3.

The method 702 begins at block 750, where the transmitter encodes a base layer signal. The transmitter can be configured to encode the base layer signal using block codes, turbo codes, interleavers, scramblers, and other encoding elements. The transmitter proceeds to block 760 and encodes an enhancement layer signal. Although blocks 750 and 760 are shown in series, the order of the blocks is not critical, and the transmitter may perform both blocks concurrently.

After encoding the base layer and enhancement layer, the transmitter proceeds to block 770 and maps the layered modulation signals to a layered modulation signal constellation. In one embodiment, the transmitter can select one base layer symbol and one enhancement layer symbol and can map the symbols to a constellation point. In one embodiment, the transmitter can map the base layer and enhancement layer signal to a constellation point having a predetermined energy ratio. In another embodiment, the transmitter can map the base layer in combination with the enhancement layer signal to a constellation point in a constellation having an energy ratio selected from a plurality of energy ratios.

The transmitter proceeds to block 780 and assigns the constellation point to a logical channel that corresponds to a particular physical channel. The physical channel can include at least one subcarrier of an OFDM symbol. In some embodiments, the transmitter can select or otherwise configure the energy ratio of the signal when assigning a physical channel and modulating the one or more subcarriers corresponding to the physical channel.

After modulating the layered modulation signal onto a subcarrier, the transmitter proceeds to block 790 and transmits the layered modulation signal. In one embodiment, the transmitter can combine the layer modulated subcarriers with one or more subcarriers corresponding to one or more additional physical channels. The other subcarriers can be modulated with the same energy ratio or a different energy ratio. Some of the subcarriers may be modulated with single layer signals, while others are modulated with layered modulation signals.

The transmitter can be configured to generate a signal from the layer modulated subcarrier and transmit the generated layered modulation signal. In one embodiment, the transmitter can combine the modulated subcarrier with other subcarriers from an OFDM symbol, transform the subcarriers to the OFDM symbol, and transmit the OFDM symbol.

Figure 8:
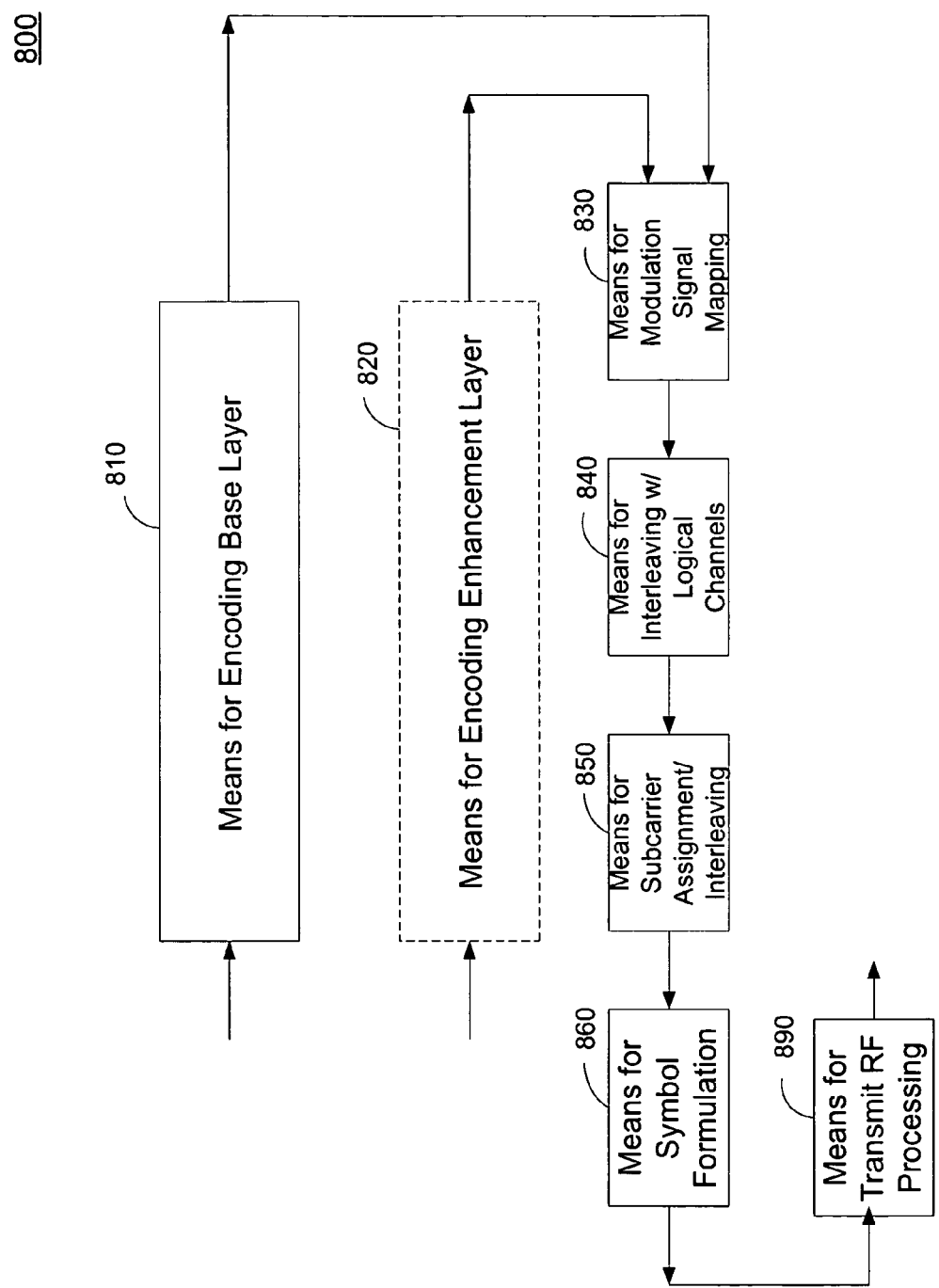
FIG. 8 is a simplified functional block diagram of an embodiment of a transmitter in a layered coded modulation system.

FIG. 8 is a simplified functional block diagram of an embodiment of a transmitter 800 in a layered coded modulation system. The transmitter 800 can be the transmitter in the system of FIG. 1.

The transmitter 800 includes means for encoding a base layer 810 and independent means for encoding an enhancement layer 820. The means for encoding the base layer 810 and means for encoding the enhancement layer 820 can each include various means for encoding a signal including, but not limited to, means for block encoding, means for turbo encoding, means for interleaving, means for scrambling, and other means for encoding.

The means for encoding the base layer 810 and the means for encoding the enhancement layer 820 are coupled to a means for modulating and mapping the encoded symbols 830. The means for modulation signal mapping 830, also referred to as a means for mapping signals, is configured to map the encoded symbols to a layered modulation constellation point. The means for mapping signals 830 can be configured to map the encoded symbols to a constellation having an energy ratio selected from a plurality of energy ratios.

The transmitter couples the mapped signals to a means for interleaving 840 configured to interleave the mapped constellation point with other signal interleaves assigned to the same logical channel. The output of the means for interleaving 840 is coupled to a means for subcarrier assignment 850 configured to map the logical channels to physical channels. The physical channels can include one or more subcarriers and the means for subcarrier assignment 850 can be configured to modulate the subcarrier with an appropriate constellation point using a means for modulating a subcarrier.

The means for subcarrier assignment 850 can also be configured to interleave the physical channels assigned to a plurality of logical channels. Each of the physical channels can be modulated with a constellation having a different energy ratio.

The output of the means for subcarrier assignment 850 is coupled to a means for symbol formulation 860 that can be configured to generate an OFDM symbol from the combination of subcarriers. The output of the means for symbol formulation 860 is coupled to a means for transmit processing 890 for translation to an operating frequency for wireless transmission.

Figure 9:
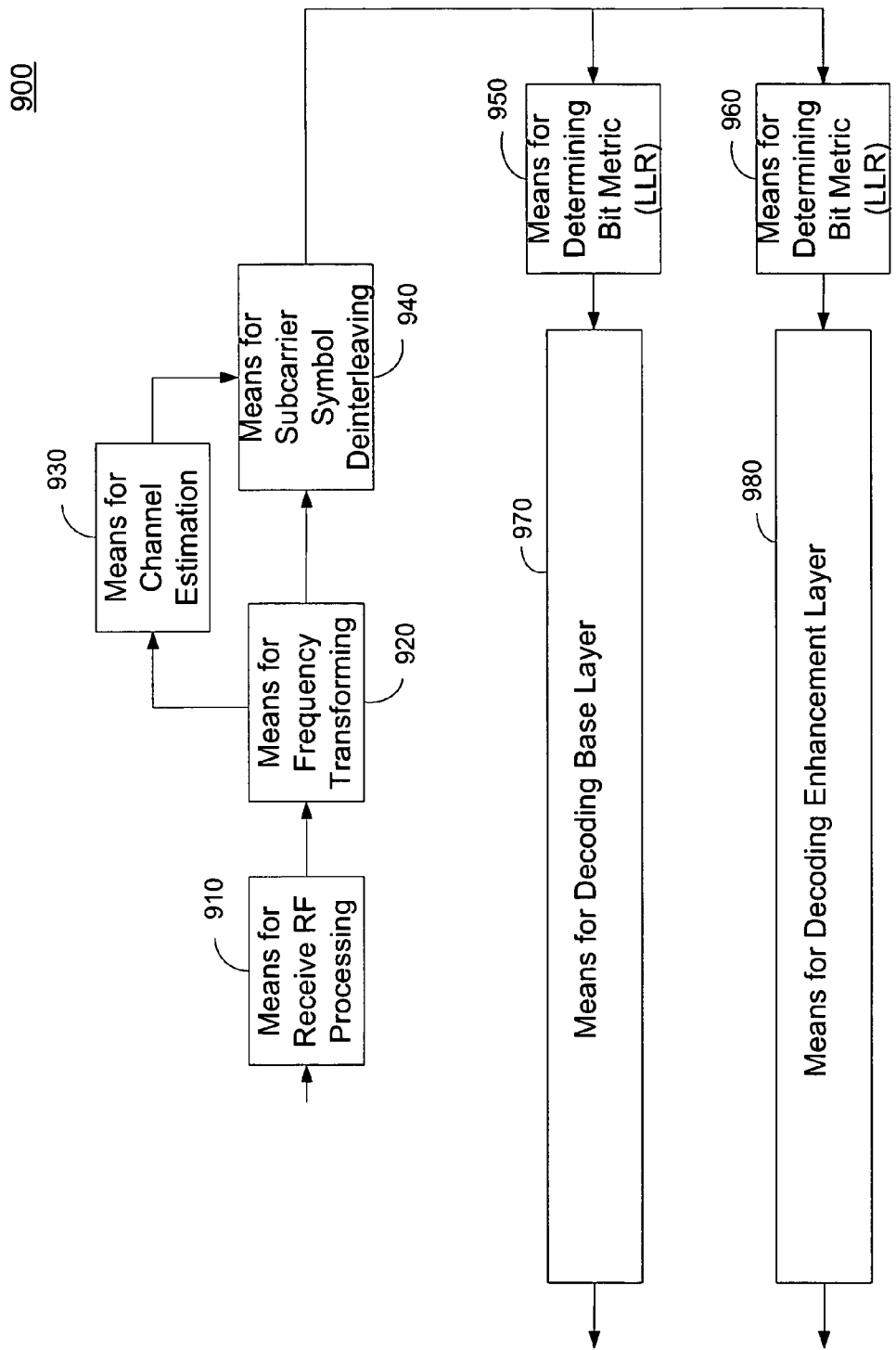
FIG. 9 is a simplified functional block diagram of an embodiment of a receiver configured for operation in a layered modulation system.

FIG. 9 is a simplified functional block diagram of an embodiment of a receiver 900 configured for operation in a layered modulation system. The receiver 900 can be, for example, implemented in the user terminal of the system of FIG. 1.

The receiver 900 includes means for receive processing 910 configured to receive and process a wireless signal, such as a layer modulated RF signal. The output of the means for receive processing 910 is coupled to a means for frequency transforming 920 configured to transform a received signal, such as a layer modulated OFDM symbol, to a frequency domain signal. For example, an OFDM symbol can be transformed to a plurality of subcarriers, each of which can be modulated with a layered modulation signal.

The output of the means for frequency transforming 920 is coupled to a means for channel estimation 930 and a means for subcarrier symbol deinterleaving 940. The means for channel estimation 930 can be configured to generate a channel estimate, can be configured to generate a channel estimate for a plurality of subcarriers of the OFDM symbol. The means for channel estimation 930 can include means for filtering the plurality of channel estimates. The means for filtering the plurality of channel estimates can include means for comparing an actual channel estimate component to a channel estimation threshold value. The means for filtering the plurality of channel estimates can also include means for selecting as a channel estimate component, one of the actual channel estimate component or a predetermined value, based on the comparison.

The means for subcarrier symbol deinterleaving 940 can be configured to separate the base layer and enhancement layer symbols from the received signal and can route the symbols to respective decoder paths. The base layer decoder path and the enhancement layer decoder paths can be substantially independent, and the enhancement layer decoder can operate concurrent with the base layer decoder.

A base layer decoder path includes a means for determining a base layer bit metric 950 coupled to the means for subcarrier symbol deinterleaving 940. The means for determining a base layer bit metric 950 is configured to determine a signal metric, such as a LLR for turbo encoded signals. The output of the means for determining a base layer bit metric 950 is coupled to a means for decoding the base layer 970.

The enhancement layer decoder path is similar to the base layer decoding path. A means for determining an enhancement layer bit metric 960 is coupled to the means for subcarrier symbol deinterleaving 940. The output of the means for determining an enhancement layer bit metric 960 is coupled to a means for decoding the enhancement layer 980.

Methods and apparatus for a receiver configured to decode base layer and enhancement layer data substantially concurrently and substantially in parallel have been described herein. The receiver can be configured to decode layered modulation data, where the underlying base and enhancement layer data has been encoded, such as by using a turbo encoder. The received signals can be single channel signals or can be multi-channel signals, with each of the multiple channels carrying layered modulation, and each layered modulation can have a different energy ratio. The receiver can substantially independently decode each of the channels.

Each of the base layer and enhancement layer decoders can include a bit metric module configured to provide a metric based on the received signal quality. The metric can be a log likelihood ratio (LLR) when the signals are turbo encoded. The log likelihood ratio can be an exact LLR value or can be an estimated LLR value. The estimated LLR value can be an estimate determined based in part on the maximum ratio corresponding to one of the constellation points in the layered modulation constellation.

The LLR values can depend on the received signal magnitude and the channel estimate. The bit metric modules can further be configured to utilize a channel estimate threshold value that can be used to determine whether an actual channel estimate or a predetermined value is used for the channel estimate. The base layer and enhancement layer decoders, and the corresponding bit metric modules, can utilize channel threshold values that are optimized for the particular layer of data. Alternatively, the base and enhancement layer decoders can use the same channel estimate threshold value, trading off some signal quality for simplified implementation.

The various illustrative logical blocks, modules, and circuits described in connection with the embodiments disclosed herein may be implemented or performed with a general purpose processor, a digital signal processor (DSP), a Reduced Instruction Set Computer (RISC) processor, an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The steps of a method, process, or algorithm described in connection with the embodiments disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A receiver configured to decode a received signal having layered modulation data, the receiver comprising:
    an RF processor configured to receive the layered modulation data and configured to frequency convert the layered modulation data to substantially a baseband frequency;
    a base layer decoder coupled to the RF processor and configured to decode a base layer data from the layered modulation data;
    an enhancement layer decoder coupled to the RF processor and configured to decode an enhancement layer data from the layered modulation data, the enhancement layer decoder operating substantially independent of the base layer decoder; and
    a channel estimator coupled to the RF processor and configured to generate a channel estimate corresponding to a channel carrying the layered modulation data, wherein the channel estimator is configured to compare a component of the channel estimate to a threshold value and select as an updated channel estimate component one of a predetermined value and the channel estimate component, based in part on the comparison;
    wherein each of the base layer decoder and enhancement layer decoder comprises a bit metric module configured to determine a log likelihood ratio based in part on the layered modulation data;
    wherein the base layer decoder and the enhancement layer decoder are configured to concurrently process a same received layered modulation constellation point from the layered modulation data;
    wherein the layered modulation data comprises alternating bits from the base layer data and the enhancement layer data within each received layered modulation constellation point, and a received layered modulation constellation that follows Gray mapping.

2. The receiver of claim 1, wherein the base layer decoder and the enhancement layer decoder are configured to operate on the layered modulation data corresponding to a same subcarrier within a multi-carrier system.

3. The receiver of claim 1, wherein the base layer decoder is configured to turbo decode one or more base layer symbols to generate the base layer data.

4. The receiver of claim 1, wherein the bit metric module of the base layer decoder is coupled to the RF processor and the channel estimator, and configured to determine a log likelihood ratio (LLR) based in part on the layered modulation data and the channel estimate.

5. The receiver of claim 1, wherein the bit metric module in each of the base layer decoder and enhancement layer decoder is configured to use the same channel estimate.

6. A receiver configured to decode a received signal having layered modulation data, the receiver comprising:
    an RF processor configured to receive an OFDM symbol, wherein at least one subcarrier in the OFDM symbol carries layered modulation data;
    an FFT module coupled to the RF processor and configured to transform the OFDM symbol to a plurality of subcarriers;
    a base layer decoder coupled to the FFT module and configured to decode a base layer data from the at least one subcarrier carrying the layered modulation data;

an enhancement layer decoder coupled to the FFT module and configured to decode an enhancement layer data from the at least one subcarrier carrying the layered modulation data, the enhancement layer decoder operating substantially independent of the base layer decoder; and a channel estimator coupled to the RF processor and configured to generate a channel estimate corresponding to a channel carrying the layered modulation data, wherein the channel estimator is configured to compare a component of the channel estimate to a threshold value and select as an updated channel estimate component one of a predetermined value and the channel estimate component, based in part on the comparison;

wherein each of the base layer decoder and enhancement layer decoder comprises a bit metric module configured to determine a log likelihood ratio based in part on the layered modulation data;

wherein the base layer decoder and the enhancement layer decoder are configured to concurrently process a same received layered modulation constellation point from the layered modulation data;

wherein the layered modulation data comprises alternating bits from the base layer data and the enhancement layer data within each received layered modulation constellation point, and a received layered modulation constellation that follows Gray mapping.

7. The receiver of claim 6, wherein the base layer decoder and the enhancement layer decoder are configured to operate on the layered modulation data corresponding to a same subcarrier within a multi-carrier system.

8. The receiver of claim 6, wherein the base layer decoder is configured to turbo decode one or more base layer symbols to generate the base layer data.

9. The receiver of claim 6, wherein the base layer decoder comprises a bit metric module coupled to the RF processor and the channel estimator, and configured to determine a log likelihood ratio (LLR) based in part on the layered modulation data and the channel estimate.

10. The receiver of claim 6, wherein the bit metric module in each of the base layer decoder and enhancement layer decoder is configured to use the same channel estimate.

11. A method of decoding a layered modulation signal by a receiver, the method comprising:
receiving a layered modulation signal;
decoding a base layer data from the layered modulation signal;
decoding an enhancement layer data from the layered modulation signal substantially concurrently with decoding the base layer data; and
generating a channel estimate based on a received OFDM symbol and a channel estimation threshold value by comparing an actual channel estimate component to the channel estimation threshold value and selecting as a channel estimate component, one of the actual channel estimate component or a predetermined value based on the comparison;
wherein each of the base layer data and enhancement layer data is decoded comprises a bit metric module configured to determine a log likelihood ratio based in part on the layered modulation data;
wherein the base layer data and the enhancement layer data are concurrently processed from a same received layered modulation constellation point from the layered modulation data;
wherein the layered modulation data comprises alternating bits from the base layer data and the enhancement layer data within each received layered modulation constellation point, and a received layered modulation constellation that follows Gray mapping.

12. The method of claim 11, wherein decoding the enhancement layer data comprises decoding the enhancement layer data from the layered modulation signal substantially independent of the base layer data.

13. The method of claim 11, wherein decoding the base layer data comprises determining a log likelihood ratio (LLR) of base layer bits based on the layered modulation signal and a channel estimate.

14. The method of claim 11, wherein the predetermined value comprises a substantially insignificant value.

15. The method of claim 11, wherein decoding the enhancement layer data comprises determining a (LLR) of enhancement layer bits based on layered modulation signal and a channel estimate.

16. The method of claim 15, wherein the channel estimate comprises a plurality of channel estimate components, each of the plurality of channel estimate components comprising one of an actual channel estimate component or a predetermined value based on a comparison of the actual channel estimate component to a threshold value.

17. A machine readable storage device configured to store one or more processor usable instructions comprising:
receiving an OFDM symbol including data in a layered modulation channel;
generating a channel estimate based in part on the OFDM symbol by comparing each of a plurality of channel estimate components to a threshold value and selecting, for each of the plurality of channel estimate components, one of the channel estimate component or a predetermined value based on the comparison of the channel estimate component to the threshold value;
decoding a base layer data from the layered modulation channel; and
decoding an enhancement layer data from the layered modulation channel concurrently with decoding the base layer data and substantially independent of the base layer data decoding;
wherein each of the base layer data and enhancement layer data is decoded utilizing a bit metric module configured to determine a log likelihood ratio based in part on the layered modulation data
wherein the base layer data and the enhancement layer data are concurrently processed from a same received layered modulation constellation point from the layered modulation data;
wherein the layered modulation data comprises alternating bits from the base layer data and the enhancement layer data within each received layered modulation constellation point, and a received layered modulation constellation that follows Gray mapping.

18. The storage device of claim 17, wherein the instructions for decoding the enhancement layer data further comprise decoding the enhancement layer data from the layered modulation signal substantially independent of the base layer data.

19. The storage device of claim 17, wherein decoding the base layer data further comprises determining a log likelihood ratio (LLR) of base layer bits based on the layered modulation signal and a channel estimate.

20. The storage device of claim 17, wherein the predetermined value comprises a substantially insignificant value.

21. The storage device of claim 17, wherein the instructions for decoding the enhancement layer further comprise determining a (LLR) of enhancement layer bits based on layered modulation signal and a channel estimate.

22. The storage device of claim 17, wherein the channel estimate comprises a plurality of channel estimate components, each of the plurality of channel estimate components comprising one of an actual channel estimate component or a predetermined value based on a comparison of the actual channel estimate component to a threshold value.

23. A transmitter configured to encode a signal having layered modulation data, the transmitter comprising:
 a base layer encoder configured to encode base layer data to base layer symbols;
 an enhancement layer encoder configured to encode enhancement layer data to enhancement layer symbols;
 a signal mapper coupled to the base layer encoder and enhancement layer encoder and configured to map at least one base layer symbol in combination with at least one enhancement layer symbol to a layered modulation constellation point, wherein the layered modulation data comprises alternating bits from the base layer data and the enhancement layer data within the layered modulation constellation point, and configured to map a layered modulation constellation that follows Gray mapping; and
 a subcarrier assignment module configured to modulate at least one tone from a logical channel corresponding to a particular physical channel with the layered modulation constellation point based on an energy ratio selected from a plurality of energy ratios to generate a layered modulation subcarrier,
 wherein the subcarrier assignment module is further configured to combine the layered modulation subcarrier with one or more other subcarriers corresponding to one or more additional physical channels, at least one of the one or more other subcarriers being modulated with a different energy ratio than the layered modulation subcarrier.

24. The transmitter of claim 23, wherein the plurality of energy ratios comprise an energy ratio of approximately four and an energy ratio of approximately nine.

25. The transmitter of claim 23, wherein the subcarrier assignment module is further configured to assign the logical channel to a subset of OFDM subcarriers, where the subset of OFDM subcarriers includes the at least one tone.

26. A method of transmitting a signal having layered modulation data by a transmitter, the method comprising:
 encoding a base layer signal to base layer symbols;
 encoding an enhancement layer signal to enhancement layer symbols;
 mapping a base layer symbol in conjunction with an enhancement layer symbol to a layered modulation constellation point in a layered modulation constellation following Gray mapping and having an energy ratio selected from a plurality of energy ratios, wherein the layered modulation data comprises alternating bits from the base layer signal and the enhancement layer signal within the layered modulation constellation point;
 modulating at least one tone from a logical channel corresponding to a particular physical channel with the layered modulation constellation point to generate a layered modulation subcarrier; and
 combining the layered modulation constellation subcarrier with one or more other subcarriers corresponding to one or more additional physical channels, at least one of the one or more other subcarriers being modulated with a different energy ratio than the layered modulation constellation subcarrier.

27. The method of claim 26, wherein the at least one tone is selected from a plurality of subcarriers of an OFDM symbol.

28. The method of claim 26, further comprising transmitting an OFDM symbol comprising the layered modulation subcarrier.

29. The method of transmitting of claim 18, wherein the plurality of energy ratios comprise an energy ratio of approximately four and an energy ratio of approximately nine.

30. A receiver configured to decode a received signal having layered modulation data, the receiver comprising:
 means for receiving a layered modulation signal;
 means for decoding a base layer data from the layered modulation signal;
 means for decoding an enhancement layer data from the layered modulation signal substantially concurrently with decoding the base layer data; and
 means for channel estimation configured to generate a channel estimate based on the layered modulation signal comprising means for comparing an actual channel estimate component to a channel estimation threshold value and means for selecting as a channel estimate component, one of the actual channel estimate component or a predetermined value based on the comparison;
 wherein each of the means for decoding the base layer data and the enhancement layer data comprises a bit metric means configured to determine a log likelihood ratio based in part on the layered modulation data;
 wherein each of the means for decoding the base layer data and the enhancement layer data are configured to concurrently process a same received layered modulation constellation point from the layered modulation data;
 wherein the layered modulation data comprises alternating bits from the base layer data and the enhancement layer data within each received layered modulation constellation point, and a received layered modulation constellation that follows Gray mapping.

31. The receiver of claim 30, wherein the layered modulation signal comprises an OFDM symbol, and wherein the receiver further comprises:
 means for transforming the OFDM symbol to a plurality of subcarriers; and
 means for generating a channel estimate based on at least one subcarrier from the plurality of subcarriers.

32. The receiver of claim 30, wherein the layered modulation signal comprises an OFDM symbol comprising a plurality of subcarriers, at least two of the plurality of subcarriers modulated with layered modulation data having different energy ratios.

33. The receiver of claim 30, wherein the means for decoding the base layer data and the means for decoding the enhancement layer data further comprise means for operating on the layered modulation data corresponding to a same subcarrier within a multi-carrier system.

34. The receiver of claim 30, wherein the means for decoding the base layer data further comprises means for turbo decoding one or more base layer symbols to generate the base layer data.

35. The receiver of claim 30, further comprising means for determining a log likelihood ratio (LLR) based in part on the layered modulation data and the channel estimate.

36. The receiver of claim 30, wherein the bit metric means in each of the means for decoding the base layer data and enhancement layer data is configured to use the same channel estimate.

37. A transmitter configured to encode a signal having layered modulation data, the transmitter comprising:
- means for encoding a base layer signal to base layer symbols;
- means for encoding an enhancement layer signal to enhancement layer symbols;
- means for modulating at least one tone from a logical channel corresponding to a particular physical channel with the layered modulation constellation point to generate a layered modulation subcarrier; and
- means for combining the layered modulation constellation subcarrier with one or more other subcarriers corresponding to one or more additional physical channels, at least one of the one or more other subcarriers being modulated with a different energy ratio than the layered modulation constellation subcarrier.

38. The transmitter of claim 37, wherein the means for modulating at least one tone comprises modulating a subcarrier from a plurality of OFDM subcarriers with the constellation point.

39. The transmitter of claim 24, further comprising means for transmitting an OFDM symbol comprising the plurality of subcarriers.

40. A machine readable storage device configured to store one or more processor usable instructions comprising:
- encoding a base layer signal to base layer symbols;
- encoding an enhancement layer signal to enhancement layer symbols;
- mapping a base layer symbol in conjunction with an enhancement layer symbol to a layered modulation constellation point in a layered modulation constellation following Gray mapping and having an energy ratio selected from a plurality of energy ratios, wherein the layered modulation data comprises alternating bits from the base layer signal and the enhancement layer signal within the layered modulation constellation point;
- modulating at least one tone from a logical channel corresponding to a particular physical channel with the layered modulation constellation point to generate a layered modulation subcarrier; and
- combining the layered modulation subcarrier with one or more other subcarriers corresponding to one or more additional physical channels, at least one of the one or more other subcarriers being modulated with a different energy ratio than the layered modulation constellation subcarrier.

41. The storage device of claim 40, wherein the at least one tone is selected from a plurality of subcarriers of an OFDM symbol.

42. The storage device of claim 40, wherein the instructions further comprise transmitting an OFDM symbol comprising the layered modulation subcarrier.

43. The storage device of claim 40, wherein the plurality of energy ratios comprise an energy ratio of approximately four and an energy ratio of approximately nine.

44. A system for processing a signal having a layered modulation data comprising:
- a transmitter configured to encode the layered modulation signal, the transmitter comprising:
  - a base layer encoder to encode base layer data to base layer symbols;
  - an enhancement layer encoder configured to encode enhancement layer data to enhancement layer symbols;
  - a signal mapper coupled to the base layer encoder and enhancement layer encoder and configured to map at least one base layer symbol in combination with at least one enhancement layer symbol to a layered constellation point, wherein the layered modulation data comprises alternating bits from the base layer data and the enhancement layer data within the layered modulation constellation point, and configured to map a layered modulation constellation that follows Gray mapping; and
  - a subcarrier assignment module configured to modulate at least one tone from a logical channel corresponding to a particular physical channel with the layered modulation constellation point based on an energy ratio selected from a plurality of energy ratios to generate a layered modulation subcarrier,
  - wherein the subcarrier assignment module is further configured to combine the layered modulation subcarrier with one or more other subcarriers corresponding to one or more additional physical channels, at least one of the one or more other subcarriers being modulated with a different energy ratio than the layered modulation subcarrier; and
- a receiver configured to receive the layered modulation signal, the receiver comprising:
  - an RF processor configured to receive the layered modulation data and configured to frequency convert the layered modulation data to substantially baseband frequency;
  - a base layer decoder coupled to the RF processor and configured to decode a base layer data from the layered modulation data; and
  - an enhancement layer decoder coupled to the RF processor and configured to decode an enhancement layer data from the layered modulation data, the enhancement layer decoder operating substantially independent of the base layer decoder,
- wherein each of the base layer decoder and enhancement layer decoder comprises a bit metric module configured to determine a log likelihood ratio based in part on the layered modulation data.

45. The system of claim 44, wherein the plurality of energy ratios comprise an energy ratio of approximately four and an energy ratio of approximately nine.

46. The system of claim 44, wherein the subcarrier assignment module is further configured to assign the logical channel to a subset of OFDM subcarriers, where the subset of OFDM subcarriers includes the at least one tone.

47. The system of claim 44, wherein the base layer decoder and the enhancement layer decoder are configured to concurrently process a same received layered modulation constellation point from the layered modulation data.

48. The system of claim 44, wherein the base layer decoder and the enhancement layer decoder are configured to operate on the layered modulation data corresponding to a same subcarrier within a multi-carrier system.

49. The system of claim 44, wherein the base layer decoder is configured to turbo decode one or more base layer symbols to generate the base layer data.

50. The system of claim 44, wherein the receiver further comprises a channel estimator coupled to the RF processor and configured to generate a channel estimate corresponding to a channel carrying the layered modulation data.

51. The system of claim 50, wherein the bit metric module of the base layer decoder is coupled to the channel estimator, and is further configured to determine the log likelihood ratio (LLR) based in part on the channel estimate.

52. The system of claim 51, wherein the channel estimator is configured to compare a component of the channel estimate to a threshold value and select as an updated channel estimate component one of a predetermined value and the channel estimate component based in part on the comparison.

53. The system of claim 44, wherein the receiver further comprises a channel estimator configured to generate a channel estimate, in part, by comparing a channel estimate component to a threshold value and selecting as an updated channel estimate component one of a predetermined value and the channel estimate component, based in part on the comparison.

54. The system of claim 53, wherein the bit metric module in each of the base layer decoder and the enhancement layer decoder is configured to use the same channel estimate.

* * * * *